US010280300B2

(12) United States Patent
Okamaoto et al.

(10) Patent No.: US 10,280,300 B2
(45) Date of Patent: May 7, 2019

(54) MANUFACTURING METHOD OF GASKET, GASKET MATERIAL MOLDING THE GASKET FOR HEAT EXCHANGER, AND HEAT EXCHANGER

(71) Applicant: DENSO CORPORATION, Kariya, Aichi-pref. (JP)

(72) Inventors: Shinichi Okamaoto, Kariya (JP); Shuhei Yamazaki, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/849,933

(22) Filed: Dec. 21, 2017

(65) Prior Publication Data
US 2018/0112071 A1   Apr. 26, 2018

Related U.S. Application Data

(62) Division of application No. 14/686,853, filed on Apr. 15, 2015, now abandoned.

(30) Foreign Application Priority Data

Apr. 17, 2014   (JP) .................................. 2014-085483

(51) Int. Cl.
*C08L 43/04*   (2006.01)
*C08L 83/04*   (2006.01)
(Continued)

(52) U.S. Cl.
CPC .......... *C08L 43/04* (2013.01); *B29C 45/0001* (2013.01); *B29C 65/48* (2013.01);
(Continued)

(58) Field of Classification Search
CPC ......... F16J 15/14; F16J 15/108; F28F 9/0226; C08K 5/5435; C08K 3/36; C08K 5/5419;
(Continued)

(56) References Cited

U.S. PATENT DOCUMENTS 5,061,736 A * 10/1991 Takahashi .............. C08J 9/0066
264/420
5,112,885 A   5/1992 Inoue et al.
(Continued)

FOREIGN PATENT DOCUMENTS

EP   2541184 A1   1/2013
JP   59-142392   8/1984
(Continued)

*Primary Examiner* — Tho V Duong
(74) *Attorney, Agent, or Firm* — Harness, Dickey & Pierce, P.L.C.

(57) ABSTRACT

A manufacturing method of a gasket adhering to a resin member, the method includes mixing a plurality of liquid materials stored separately and molding the gasket that is made of a mixture of the plurality of liquid materials. The mixture constitutes a liquid silicone-rubber composition that contains a base resin, a crosslinking agent, a curing catalytic agent, a hydrophilic silica filler, and a silane-coupling agent. The hydrophilic silica filler and the silane-coupling agent are contained in different liquid materials before the plurality of liquid materials are mixed.

4 Claims, 7 Drawing Sheets

(51) Int. Cl.

| | | |
|---|---|---|
| *F16J 15/10* | (2006.01) | |
| *F16J 15/14* | (2006.01) | |
| *F28F 9/02* | (2006.01) | |
| *B29D 99/00* | (2010.01) | |
| *B29C 45/00* | (2006.01) | |
| *B29C 65/48* | (2006.01) | |
| *C08K 3/36* | (2006.01) | |
| *C08K 5/5419* | (2006.01) | |
| *C08K 5/56* | (2006.01) | |
| *C08L 83/00* | (2006.01) | |
| *B29K 19/00* | (2006.01) | |
| *B29L 31/26* | (2006.01) | |
| *C08G 77/12* | (2006.01) | |
| *C08G 77/20* | (2006.01) | |
| *B29K 83/00* | (2006.01) | |

(52) U.S. Cl.
CPC ............ *B29D 99/0085* (2013.01); *C08K 3/36* (2013.01); *C08K 5/5419* (2013.01); *C08K 5/56* (2013.01); *C08L 83/00* (2013.01); *C08L 83/04* (2013.01); *F16J 15/102* (2013.01); *F16J 15/108* (2013.01); *F16J 15/14* (2013.01); *F28F 9/0226* (2013.01); *B29K 2019/00* (2013.01); *B29K 2083/005* (2013.01); *B29L 2031/265* (2013.01); *C08G 77/12* (2013.01); *C08G 77/20* (2013.01); *C08L 2205/025* (2013.01); *C08L 2205/03* (2013.01); *F28F 2230/00* (2013.01)

(58) Field of Classification Search
CPC ....... C08K 5/56; B29C 45/0001; B29C 65/48; C08L 83/04
See application file for complete search history.

(56) References Cited

U.S. PATENT DOCUMENTS

| | | | | |
|---|---|---|---|---|
| 5,384,384 | A | * | 1/1995 | Inoue ................. C08K 5/14 528/24 |
| 8,999,485 | B2 | * | 4/2015 | Otomo ............... C08L 83/04 428/131 |
| 9,284,454 | B2 | | 3/2016 | Delehanty et al. |
| 2009/0025870 | A1 | * | 1/2009 | Tanaka ............... C08F 265/04 156/273.3 |
| 2009/0255657 | A1 | | 10/2009 | Hakamata et al. |
| 2012/0175096 | A1 | | 7/2012 | Hakamata et al. |
| 2012/0325449 | A1 | * | 12/2012 | Okamoto ............ F28F 9/0226 165/173 |
| 2013/0011606 | A1 | | 1/2013 | Otomo et al. |
| 2014/0051788 | A1 | | 2/2014 | Suzuki |

FOREIGN PATENT DOCUMENTS

| | | |
|---|---|---|
| JP | H06-340813 A | 12/1994 |
| JP | H07-24884 A | 1/1995 |
| JP | 2826139 B2 | 11/1998 |
| JP | 2009-257658 A | 11/2009 |
| JP | 2012-145237 A | 8/2012 |
| JP | 2012-214777 A | 11/2012 |
| JP | 2013-032901 A | 2/2013 |
| WO | WO-2008/030015 A1 | 3/2008 |

\* cited by examiner

LIQUID MATERIAL E
LIQUID MATERIAL D

SILICA FILLER

MANUFACTURING METHOD OF GASKET, GASKET MATERIAL MOLDING THE GASKET FOR HEAT EXCHANGER, AND HEAT EXCHANGER

CROSS REFERENCE TO RELATED APPLICATION

This application is a divisional Application of U.S. patent application Ser. No. 14/686,853 filed on Apr. 15, 2015 which is based on Japanese Patent Application No. 2014-085483 filed on Apr. 17, 2014, the disclosures of which are incorporated herein by reference in their entirety.

TECHNICAL FIELD

The present disclosure relates to a manufacturing method of a gasket, a gasket material molding the gasket for a heat exchanger, and a heat exchanger having the gasket.

BACKGROUND

Conventionally, a heat exchanger such as a radiator has tubes and a header tank that communicates with the tubes. The header tank has a tank body made of resin and a core plate made of metal, and the tank body and the core plate are coupled. A gasket is adhered to the tank body to seal a clearance between the tank body and the core plate.

The gasket is made of a gasket material, which constitutes a liquid silicone-rubber composition, and is molded by injection molding in a state where an adhering portion between the tank body and the gasket is disposed in a mold. The silicone rubber composition contains a base resin, a crosslinking agent, a curing catalytic agent, a silane-coupling agent that is an adhesion auxiliary agent, and a silica filler.

Generally, it is known that there are two kinds of silica fillers, which are a hydrophilic silica filler and a hydrophobic silica filler. According to studies conducted by inventors of the present disclosure, a hydrophilic silica filler is more appropriate for the gasket material than a hydrophobic silica filler. The reason is that a compression set of the gasket can be smaller and a sealing effect by the gasket can be improved with a hydrophilic silica filler rather than a case where a hydrophobic silica filler is used. The compression set is, in other words, a residual distortion that occurs when the gasket is kept being compressed for a specified time period.

However, when the gasket material contains a hydrophilic silica filler, and when the gasket material is divided into two liquid materials to be stored separately, there may be a possibility of a following abnormality. Here, one of the two liquid materials contains the base resin, the hydrophilic silica filler, and the curing catalytic agent, and the other one contains the base resin, the hydrophilic silica filler, the crosslinking agent, and the silane-coupling agent. When the gasket is made of a mixture of the two liquid materials after storing the two liquid materials separately for a long time, an adhesive strength of the gasket with respect to the tank body made of resin decreases. Particularly, if the tank body is made of resin that is hardly adhered to a silicone rubber, an adhesive strength between the gasket and the tank body may be insufficient, and an adhesive failure may be caused between the gasket and the tank body.

SUMMARY

The present disclosure addresses the above issue, and it is an objective of the present disclosure to provide a manufacturing method of a gasket, a gasket material molding the gasket for a heat exchanger, and a heat exchanger having the gasket, with which an adhesive strength of the gasket with respect to the resin member in a case where the gasket is made of the gasket material that is stored for a long time.

According to the present disclosure, a manufacturing method of a gasket adhering to a resin member includes: mixing a plurality of liquid materials stored separately; and molding the gasket that is made of a mixture of the plurality of liquid materials. The mixture constitutes a liquid silicone-rubber composition that contains a base resin, a crosslinking agent, a curing catalytic agent, a hydrophilic silica filler, and a silane-coupling agent. The hydrophilic silica filler and the silane-coupling agent are contained in different liquid materials before the plurality of liquid materials are mixed.

According to studies conducted by the inventors of the present disclosure, the silane-coupling agent as a coupling component is affected by a water adsorbed on the hydrophilic silica filler, and a quantity of an alkoxy group of the silane-coupling agent decreases. As a result, an adhesive strength of the gasket to the resin member decreases while the packing material is stored.

Then, according to the present disclosure, by storing the hydrophilic silica filler and the silane-coupling agent on a condition of being separated from each other, the water adsorbed on the hydrophilic silica filler can be prevented from having an effect on the silane-coupling agent while the packing material is stored. Thus, a decrease of the adhesive strength of the gasket to the resin member can be restricted even when the gasket is made of the gasket material that is stored for a long time.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

An embodiment and modifications of the present disclosure will be described hereafter referring to drawings.

In the present embodiment, a heat exchanger is a radiator in which cooling fluid cooling a heat generator such as an engine for traveling a vehicle radiates heat, and a gasket material for a heat exchanger is used in the radiator.

Figure 1:
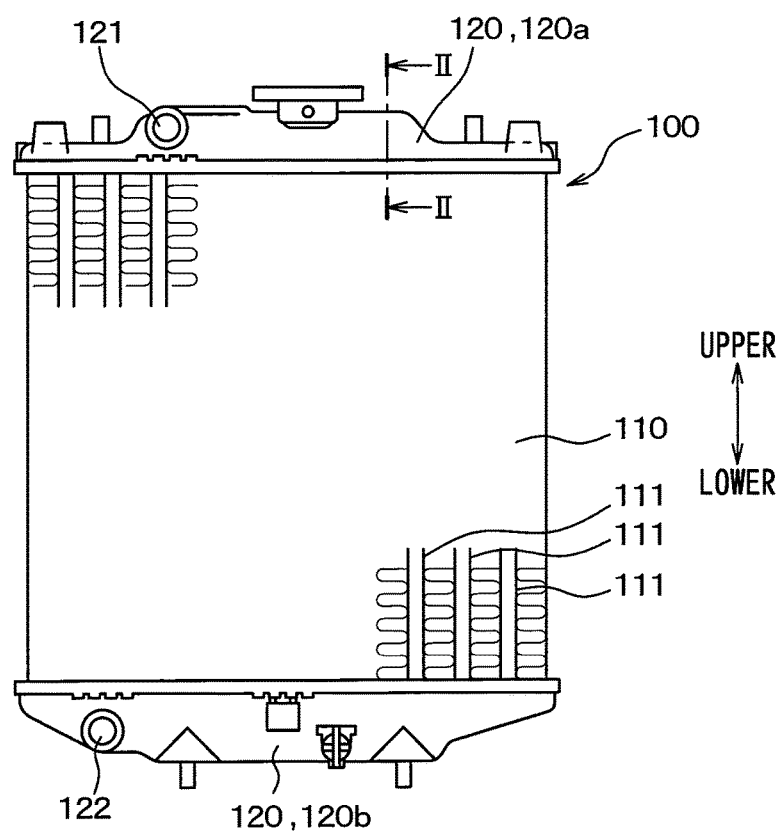
FIG. 1 is a front view illustrating a radiator according to an embodiment.

As shown in FIG. 1, a coolant as the cooling fluid exchanges heat with air in a radiator 100. The radiator 100 has tubes 111 in which the coolant flows and header tanks 120. The header tanks 120 are located at both end of the tubes 111 in a longitudinal direction of the tubes 111 and extend in a direction perpendicular to the longitudinal direction. The header tanks 120 communicate with the tubes 111.

The tubes 111 are arranged in parallel with each other, and the longitudinal direction of the tubes 111 coincides with an upper-lower direction in FIG. 1. A fin having an elongated plate shape and being corrugated is disposed between the tubes 111 such that the fin is connected to the tubes 111. The fin and the tubes 111 are made of metal such as aluminum and connected with each other by brazing. The fin and the tubes 111 constitute a core portion 110 in which the coolant exchanges heat with air.

The header tanks 120 includes a first header tank 120a that is located on an upper side of the tubes 111 in the upper-lower direction and a second header tank 120b that is located on a lower side of the tubes 111 in the upper-lower direction. The first header tank 120a and the second header tank 120b extend in a horizontal direction that is perpendicular to the longitudinal direction.

The first header tank 120a has an inlet portion 121 into which the coolant flows, and the second header tank 120b has an outlet portion 122 from which the coolant flows. A high-temperature coolant flowing from the engine flows into the first header tank 120a through the inlet portion 121 and is distributed into the tubes 111. The high-temperature coolant becomes a low-temperature coolant after a heat exchange in the core portion 110, and the low-temperature coolant is collected in the second header tank 120b and returns to the engine through the outlet portion 122.

Figure 2:
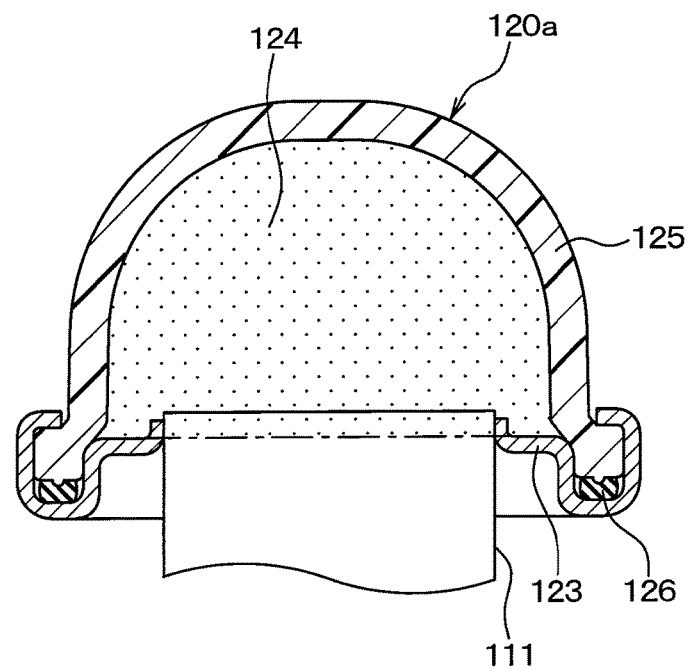
FIG. 2 is a cross-sectional view taken along a line II-II in FIG. 1.

As shown in FIG. 2, the first header tank 120a has a core plate 123 that is connected with the tubes 111 and a tank body 125. The core plate and the tank body 125 define a chamber 124.

The tank body 125 is made of resin such as polyamide 610 (PA610) that is hardly adhered to a silicone rubber component than polyamide 66 (PA66). The polyamide 610 is referred to as polyhexamethylene sebacamide. The core plate 123 is made of metal such as aluminum. A gasket 126 is adhered to a portion of the tank body 125 where the core plate 123 and the tank body 125 are connected to each other. The gasket 126 seals a clearance between the tank body 125 and the core plate 123.

The gasket 126 is molded by injection molding using a gasket material. The gasket material constitutes a liquid silicone-rubber composition and is an additional-reaction type material. The gasket material contains a base resin for a silicone rubber, a crosslinking agent for the silicone rubber, a curing catalytic agent, a silane-coupling agent, and a silica filler, as a whole.

The base resin and the crosslinking agent for the silicone rubber produce an elastic silicone polymer (i.e., a silicone rubber). The main agent is referred to as a base polymer. The base resin may be a vinyl-containing organopolysiloxane. The crosslinking agent may be an organohydorgensiloxane.

The curing catalytic agent triggers (i.e., promotes) a crosslinking reaction (i.e., a curing reaction) between the base resin and the crosslinking agent. The curing catalytic agent may be a platinum catalytic agent.

The silane-coupling agent is a coupling auxiliary agent that improves an adhesive strength between the tank body 125 and the gasket 126. A common silane-coupling agent can be used as the silane-coupling agent. A single molecular of the silane-coupling agent includes an organic functional group and a hydrolytic group. The organic functional group is, for example, an amino group or an epoxy group. The hydrolytic group is, for example, an alkoxy group such as a methoxy group.

The silica filler is an inorganic filler. In the present embodiment, a hydrophilic silica filler is mainly used, and a small volume of a hydrophobic silica filler is used as a viscous adjustment agent as described after. The hydrophilic silica filler is made of silica particles that are not hydrophobized, and the hydrophobic silica filler is made by hydrophobizing the hydrophilic silica particles. The hydrophilic silica filler and the hydrophobic silica filler are widely known, and are easily available in a market. The silicone rubber composition may contain another filler in addition to the silica filler.

A quantity of each agent in the gasket material is determined such that (i) the base resin and the crosslinking agent form a silicone polymer, (ii) a compression set becomes an appropriate degree by the hydrophilic silica filler, and (iii) the gasket 126 is adhered to the tank body 125 by the silane-coupling agent.

Figure 3:
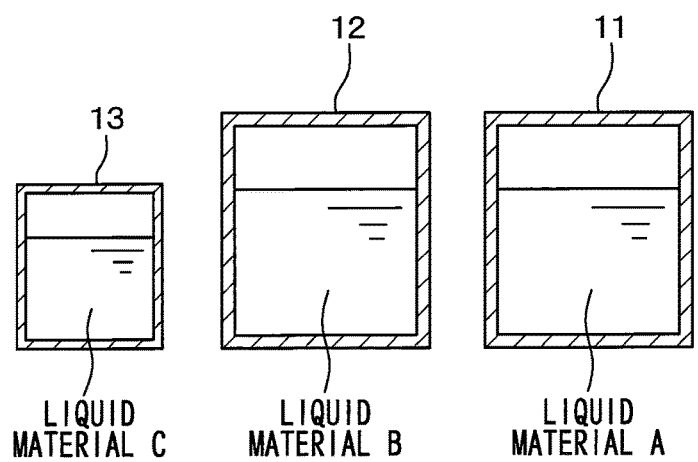
FIG. 3 is a diagram illustrating a gasket material according to the first embodiment.

The gasket material is stored on a condition of being divided into three liquid materials A, B, and C, and the liquid materials A, B, and C are stored separately, before molding the gasket 126. Specifically, as shown in FIG. 3, the liquid material A is stored in a container 11, the liquid material B is stored in a container 12, and the liquid material C is stored in a container 13. The liquid material A, the liquid material B, and the liquid material C correspond to a first liquid material, a second liquid material, and a third liquid material, respectively.

The liquid material A contains the base resin, the hydrophilic silica filler, and the curing catalytic agent. The liquid material B contains the base resin, the hydrophilic silica filler, and the crosslinking agent. The liquid material C contains the base resin, a hydrophobic silica filler, the silane-coupling agent, and no hydrophilic silica filler.

A combination ratio of each agent in each liquid material is determined based on a combination ratio of each agent in the entire gasket material (i.e., the liquid silicone-rubber composition). Each of the liquid material A, the liquid material B, and the liquid material C contains the base resin and the silica filler such that viscosities of the liquid materials A, B, and C become close to each other. Specifically, a combination ratio between the base resin and the silica filler in each liquid material is fixed such that viscosities of the liquid materials A, B, and C are equal to each other. Accordingly, the liquid material A, the liquid material B, and the liquid material C are mixed uniformly. Since the silica filler is the hydrophobic silica filler, the silane-coupling agent and the hydrophilic silica filler are separated from each other, and a viscosity of the liquid material C approaches to a viscosity of the liquid material A or a viscosity of the liquid material B.

The liquid material A, the liquid material B, and the liquid material C are mixed in advance of molding the gasket 126. That is, the liquid materials A, B, and C are prepared in advance as shown in FIG. 3, and the gasket 126 is made of a mixture of the liquid materials A, B, and C by injection molding as shown in FIG. 4.

Figure 4:
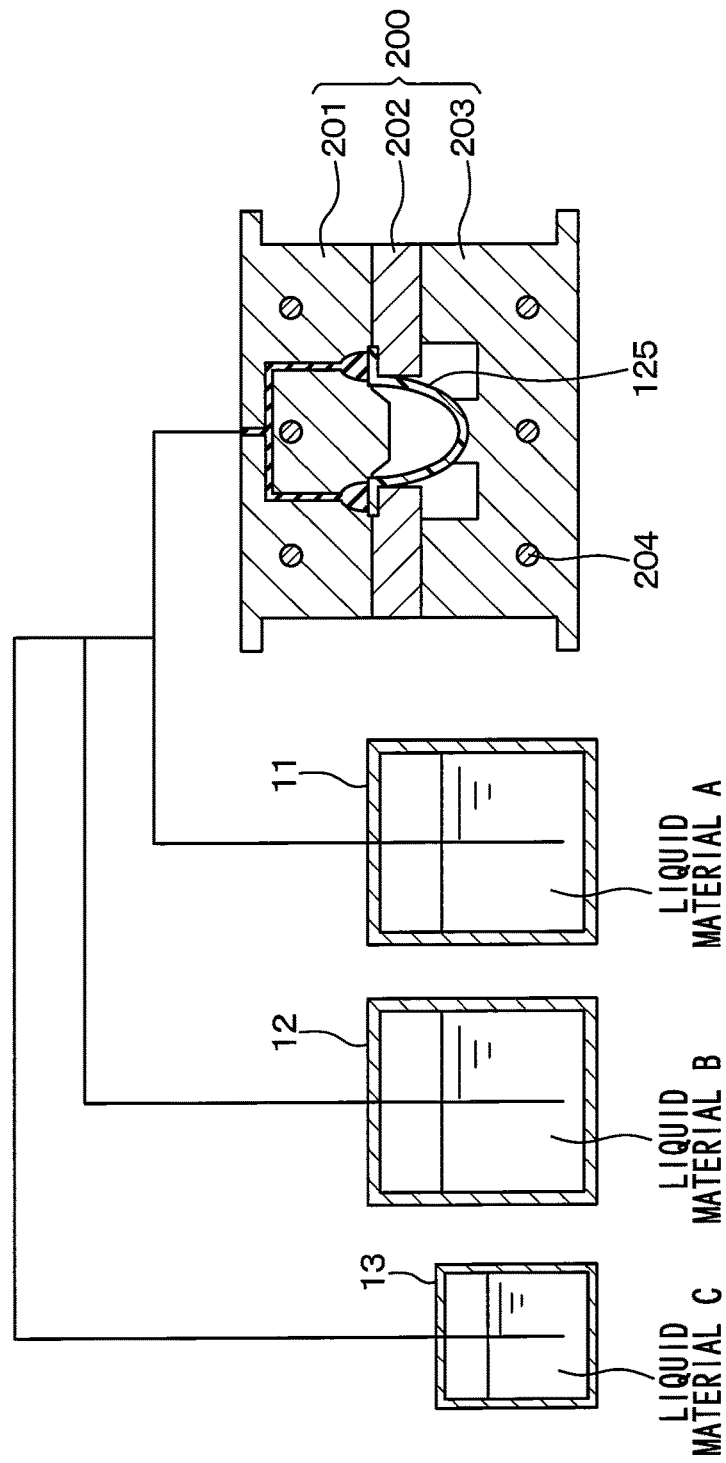
FIG. 4 is a diagram illustrating a gasket in an injection molding.

The injection molding for the gasket 126 shown in FIG. 4 is conducted in a state where end portions of the tank body 125 are located between an upper die 201 and lower dies 202 and 203 of a die 200, and where the portion of the tank body 125 to which the gasket 126 is adhered is located in the die 200. In the injection molding, the mixture of the liquid materials A, B, and C is heated by a heater 204 that is embedded in the die 200. The injection molding is conducted on following conditions:

Set temperature of the Die 200 is 180° C.;
Actual temperature of the Die 200 is 165° C.;
Resin temperature is 20° C.;
Tank Body Temperature is 120° C.;
Pressure on First Stage is 105 bar and kept for two seconds;
Pressure on Second State is 10 bar and kept for one second; and
Curing Duration: 20 is seconds.

Figure 5:
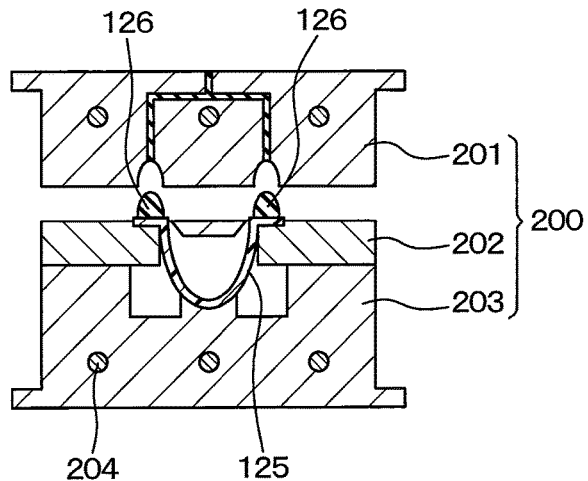
FIG. 5 is a diagram illustrating the gasket in the injection molding after FIG. 4.

In the injection molding, a curing reaction of the silicone rubber and a coupling reaction of the silicone rubber to the tank body 125 proceed. The gasket 126 is provided to be adhered to the tank body 125 by removing the upper die 201 and taking the tank body 125 out of the die 200 after the injection molding, as shown in FIG. 5.

The tank body 125 is connected with the core plate 123 to which the tubes 111 are connected. Thus, the radiator 100 is manufactured.

Figure 6:
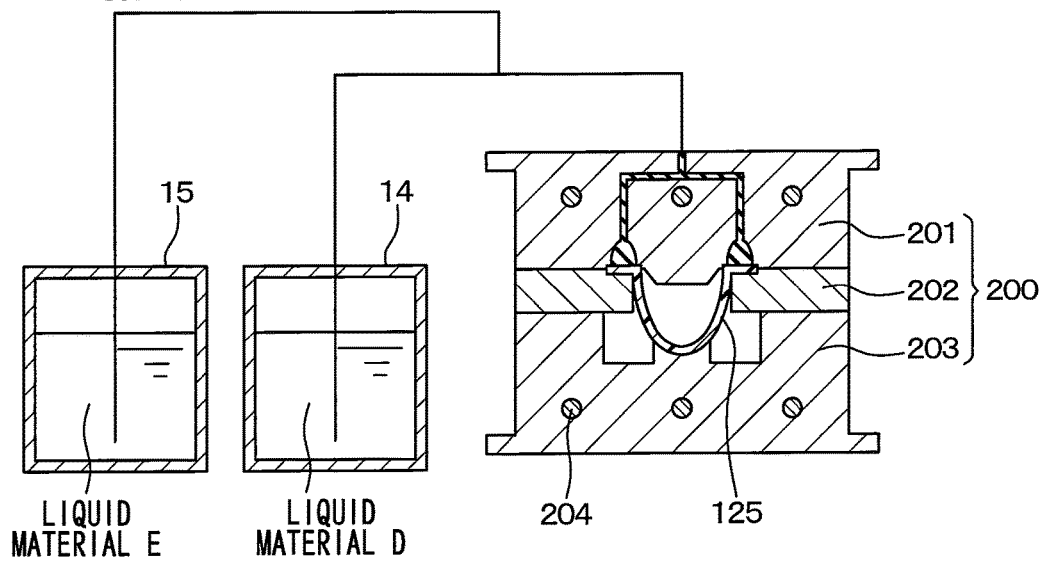
FIG. 6 is a diagram illustrating the gasket in an injection molding according to a reference example.

A reference example of the injection molding for the gasket 126 will be described referring to FIGS. 6 to 9B. In the reference example, the gasket 126 is made of a gasket material that is a mixture of two liquid materials D and E. The gasket material constitutes the liquid silicone-rubber composition as in the present embodiment. The liquid material D and the liquid material E are stored separately. Specifically, as shown in FIG. 6, the liquid material D is stored in a container 14, and the liquid material E is stored in a container 15. The liquid material D contains the base resin, the hydrophilic silica filler, and the curing catalytic agent. The liquid material E contains the base resin, the hydrophilic silica filler, the crosslinking agent, and the silane-coupling agent. That is, the liquid material D contains the same agents as the liquid material A of the present embodiment, and the liquid material E additionally contains the silane-coupling agent as compared with the liquid material B of the present embodiment. Thus, in the reference example, the gasket material as the mixture of the two liquid materials D and E contains no hydrophobic silica filler that is contained in the liquid material C in the present embodiment.

Figure 7:
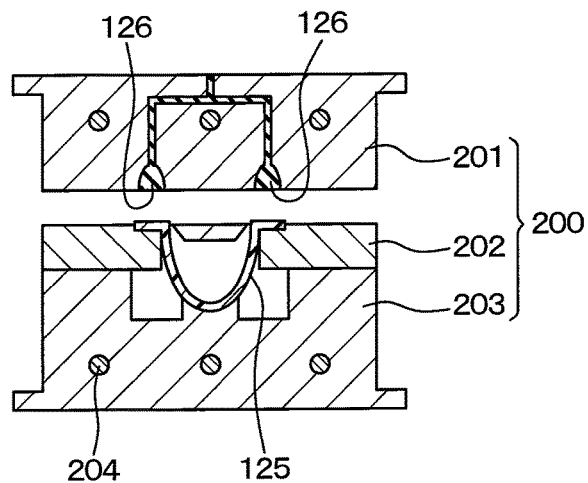
FIG. 7 is a diagram illustrating the gasket in the injection molding after FIG. 6.

In the reference example, the gasket 126 is molded by the injection molding with the mixture of the liquid materials D and E as shown in FIG. 6 after storing the liquid materials D and E separately for a long time. In this case, when the upper body 201 is removed, the gasket 126 adheres to the upper body 201 as shown in FIG. 7. As a result, an adhesive failure between the gasket 126 and the tank body 125 occurs. In a case of using the gasket material as the mixture of the two liquid materials D and E, the gasket 126 is adhered certainly to the tank body 125 if the liquid materials D and E are stored for a short time. However, when the liquid materials D and E are stored for a long time, an adhesive strength of the gasket 126 to the tank body 125 decreases, and the gasket 126 is hardly adhered to the tank body 125.

Inventors of the present disclosure conducted studies to clarify a reason why the adhesive strength of the gasket 126 to the tank body 125 decreases.

According to the studies, the adhesive strength decreases in a case where the gasket material (i.e., the liquid silicone-rubber composition) contains a hydrophilic silica filler, and does not decrease in a case where the gasket material contains only a hydrophobic silica filler or contains no silica filler.

Then, a liquid material E1 having a hydrophilic silica filler (i.e., having a hydrophilic silica), a liquid material E2 having no silica filler (i.e., having no silica), and a liquid material E3 having a hydrophobic silica filler (i.e., having a hydrophobic silica) were prepared. The liquid material E2 corresponds to the liquid material E in the gasket material that is the mixture of the two liquid materials in the reference example. The liquid material E2 is different from the liquid material E2 in a point of containing no silica filler. The liquid material E3 is different from the liquid material E1 in a point of containing the hydrophobic silica filler instead of the hydrophilic silica filler. A silane-coupling agent contained in the liquid materials E1, E2, and E3 has a methoxy group as a hydrolytic group. Each liquid material was stored under an environment in which a temperature is 40° C. and a humidity is 90%, and a $^1$H-NMR spectrum of each liquid material was measured before and after storing the each liquid material. In addition, based on measured $^1$H-NMR spectrums, a residual quantity of a methoxy group in the silane-coupling agent after storing was calculated from a signal-strength ratio of a signal strength of the methoxy group after storing the each liquid material to a signal strength of the methoxy group before storing the each liquid material. A relation among a calculated residual quantity of the methoxy group and the number of storing days is shown in FIG. 8.

Figure 8:
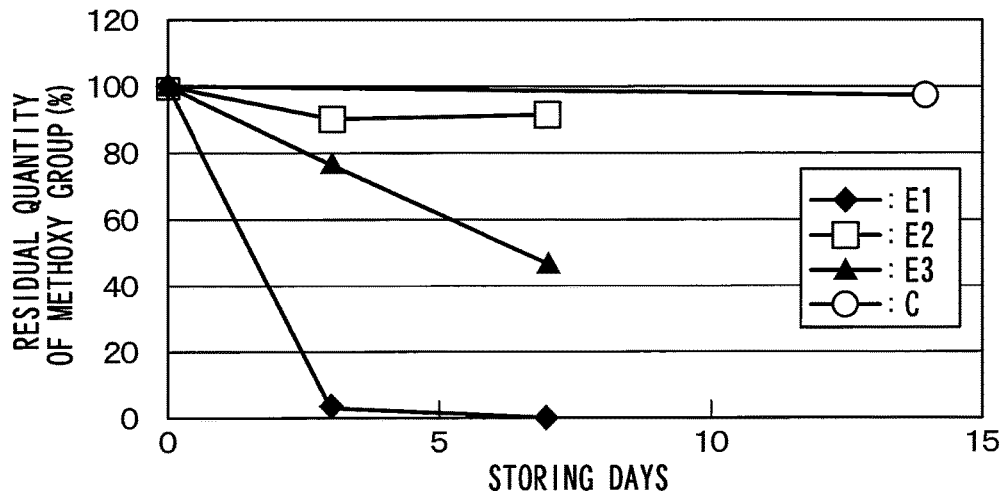
FIG. 8 is a graph showing a relation among storing days of a raw material for the gasket material and a residual quantity of a methoxy group of silane-coupling agent.

As shown in FIG. 8, the residual quantity of the methoxy group reaches 0%, in other words, there is almost no methoxy group in the liquid material E1 three days after starting a storing of the liquid material E1. Therefore, it is inferred that the adhesive strength of the gasket 126 to the tank body 125 decreases because a quantity of the methoxy group in the liquid material E1 decreases while the liquid material E1 is stored.

As shown in FIG. 8, the residual quantity of the methoxy group in the liquid material E2 is 90%, that is, the liquid material E2 contains a large quantity of the methoxy group, both three days and seven days after starting a storing of the liquid material E2. The residual quantity of the methoxy group in the liquid material E3 is 50% seven days after starting a storing the liquid material E3, and the residual quantity of the methoxy group in the liquid material E3 is larger than that in the liquid material E1. Therefore, it is inferred that a quantity of methoxy group in the silane-coupling agent decreases by an effect of the hydrophilic silica filler.

It is generally known that the hydrophilic silica filler has a high reactivity since a surface of the hydrophilic silica filler has a large quantity of polar group (e.g., a hydroxyl (OH) group). Therefore, it is inferred that water ($H_2O$) is adsorbed on the surface of the hydrophilic silica filler by a polarity of the surface. An adsorption of water on the surface of the hydrophilic silica filler was confirmed from a peak shape showing a presence of water in a $^1$H-NMR spectrum of the liquid material E1. Moreover, it is generally known that a hydrolysis of the methoxy group is promoted more effectively under an acidic condition in which a pH is lower than seven (pH<7) than under a condition in which a pH is seven (pH=7). Therefore, it is inferred that the liquid material E becomes acid by $H_3O^+$ that is produced on the surface of the silica filler since the OH group on the surface of a silica filler dissociates, and then, a hydrolysis of the methoxy group of the silane-coupling agent in the liquid material E is promoted.

Figure 9A:
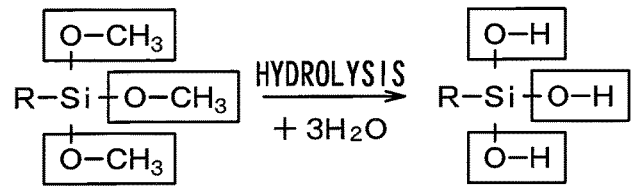
FIG. 9A is a diagram showing a chemical reaction regarding the silane-coupling agent, which occurs while two liquid materials providing the gasket material are stored.
Figure 9A:
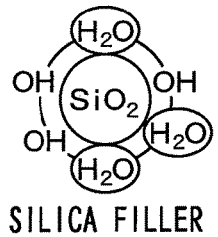
Figure 9B:
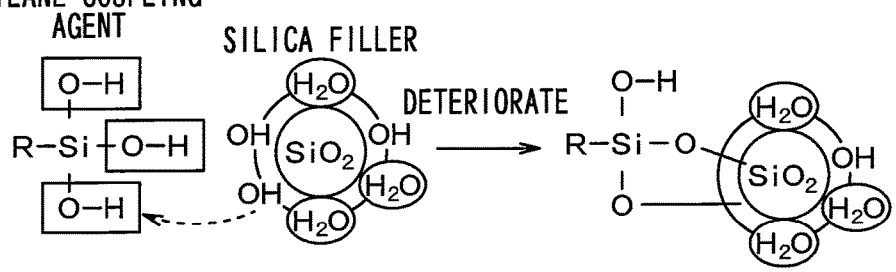
FIG. 9B is a diagram showing a chemical reaction regarding the silane-coupling agent that occurs after the chemical reaction shown in FIG. 9A.

Thus, as shown in FIG. 9A, the hydrolysis of the methoxy group (O—$CH_3$) in the silane-coupling agent is promoted by an effect of water ($H_2O$) that is adsorbed on the surface of the hydrophilic silica filler ($SiO_2$), while the two liquid materials D and E providing the gasket material are stored. Further, after the hydrolysis, the silane-coupling agent is coupled with the silica filler by a reaction of the silica filler and a silanol group (Si—O—H) that is included in the silane-coupling agent, as shown in FIG. 9B. As a result, the silane-coupling agent is deteriorated. Therefore, it is inferred that the silane-coupling agent does not work to couple the gasket with the tank body in a molding of the gasket since a quantity of the methoxy group in the silane-coupling agent decreases while the two liquid materials D and E are stored.

Then, according to the present embodiment, the gasket material is divided into the three liquid materials A, B, and C, and the liquid materials A, B, and C are stored separately. The liquid materials A and B contain the hydrophilic silica filler, and the liquid material C contains the silane-coupling agent and contains no hydrophilic silica filler. Thus, by storing the hydrophilic silica filler and the silane-coupling agent on a condition of being separated from each other, a water adsorbed on the hydrophilic silica filler can be prevented from having an effect on the silane-coupling agent while the liquid materials A, B, and C are stored. Accordingly, when the liquid material C is stored for fourteen days under a condition where a temperature is 40° C. and a humidity is 90%, a methoxy group can remain in the silane-coupling agent, as shown in FIG. 8.

Figure 10:
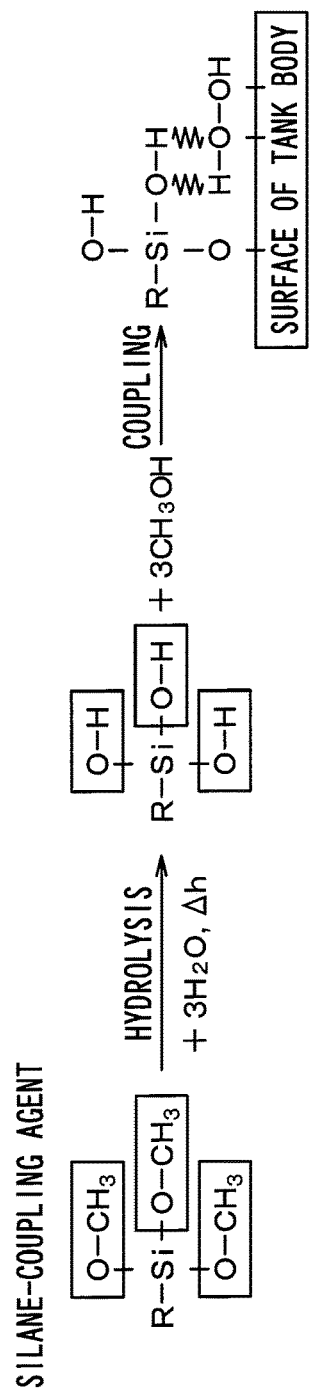
FIG. 10 is a diagram showing a chemical reaction regarding the silane-coupling agent, which occurs during a coupling reaction in the gasket material according to the first embodiment.

Therefore, in the injection molding using the mixture of the liquid materials A, B, and C that are mixed after storing the liquid materials A, B, and C for a long time, the curing reaction of the silicone rubber and the coupling reaction by the silane-coupling agent proceed. In the coupling reaction, a silanol group (Si—O—H) is produced by a hydrolysis of the methoxy group (O—$CH_3$) of the silane-coupling agent, and the silane-coupling agent and the surface of the tank body 125 are coupled by the silanol group, as shown in FIG. 10. The silicone rubber and the tank body 125 are coupled by a coupling reaction between the silicone rubber and the organic functional group (R) that is included in the silane-coupling agent.

Thus, according to the present embodiment, a decrease of the adhesive strength of the gasket 126 to the tank body 125 (i.e., a resin tank) can be restricted even when the gasket 126 is made of the gasket material that is stored for a long time.

(Other Modifications)

While the present disclosure has been described with reference to preferred embodiment thereof, it is to be understood that the disclosure is not limited to the preferred embodiment and constructions. The present disclosure is intended to cover various modification and equivalent arrangements.

(1) In the above-described embodiment, the gasket material is divided into the three liquid materials A, B, and C. However, the gasket material may be divided into two liquid materials or four or more liquid materials. In this case, the hydrophilic silica filler and the silane-coupling agent may be contained in different liquid materials, respectively.

In a case where the gasket material is the mixture of the two liquid materials D and E as in the reference example, the liquid material E may contain a hydrophobic silica filler instead of the hydrophilic silica filler. This case also produces the same effect as the above-described embodiment since the liquid material E contains the silane-coupling agent and the hydrophobic silica filler and does not contain the hydrophilic silica filler.

However, if viscosities of the liquid materials D and E are required to be close to each other, a quantity ratio of the hydrophobic silica filler with respect to a total quantity of the silica filler in an entire of the gasket material increases. As a result, a quantity of the hydrophilic silica filler in the entire gasket material becomes less than that in the above-descried embodiment. Accordingly, in a case of using a lot of hydrophilic silica filler, the gasket material may preferably consist of three liquid materials than two liquid materials, as in the above-described embodiment.

(2) In the above-described embodiment, the liquid materials B and C contain the main agent and the silica filler to adjust viscosities of the liquid materials B and C. However, the liquid materials B and C may not contain the main agent and the silica filler as long as the liquid materials A, B and C can be mixed uniformly.

(3) The above-described embodiment and modifications may be partially combined even if it is not explicitly described that the embodiment and the modifications can be combined, provided there is no harm in the combination. Further, it should be noted that elements mentioned in the embodiment and modifications are not necessary unless it is explicitly mentioned to be necessary or is explicitly considered to be necessary in principle.

EXAMPLES

Here, an evaluation test regarding an example of the present disclosure was conducted to evaluate an adhesive strength of a cured gasket material that is made of the three liquid materials A, B, and C stored for specified days. The same evaluation test was conducted with the two liquid materials D and E for a comparison example.

Each gasket material used in the evaluation test of the example and the comparison example is a mixture of the liquid materials and constitutes a liquid silicone-rubber composition (refer Table 1 for a composition ratio). As shown in Table 1, the silicone rubber composition of the example contains 100 pts. wt. base resin, 3 pts. wt. crosslinking agent, 24.6 pts. wt. hydrophilic silica filler, 0.4 pts. wt. hydrophobic silica filler, 0.75 pts. wt. coupling auxiliary agent, and 0.3 pts. wt. curing catalytic agent. The silicone rubber composition of the comparison example contains 100 pts. wt. main agent, 3 pts. wt. crosslinking agent, 25 pts. wt. hydrophilic silica filler, 0 pts. wt. hydrophobic silica filler, 0.75 pts. wt. coupling auxiliary agent, and 0.3 pts. wt. curing catalytic agent.

TABLE 1

| Composition ratio (pts. wt.) of gasket material | | |
| --- | --- | --- |
|  | Example | Comparison example |
| Base resin | 100 | 100 |
| Crosslinking agent | 3 | 3 |

TABLE 1-continued

Composition ratio (pts. wt.) of gasket material

|  | Example | Comparison example |
|---|---|---|
| Hydrophilic silica filler | 24.6 | 25 |
| Hydrophobic silica filler | 0.4 | 0 |
| Coupling auxiliary agent | 0.75 | 0.75 |
| Curing catalytic agent | 0.3 | 0.3 |

The base resin, the crosslinking agent, and the curing catalytic agent are well-known materials as listed below. The silica filler and the silane-coupling agent are also well-known materials.

Main agent: vinyl group content organopolysiloxane
Molecular weight of the base resin: 70,000
Crosslinking agent: organohydrogensiloxane
Curing catalytic agent: platinum catalytic agent The gasket material of the example includes the three liquid materials A, B, and C (refer Table 2), as described above. The liquid material A contains the base resin, the hydrophilic silica filler, and the curing catalytic agent. The liquid material B contains the base resin, the hydrophilic silica filler, and the crosslinking agent. The liquid material C contains the base resin, the hydrophobic silica filler, and the silane-coupling agent. A mixture ratio of the three liquid materials is, the liquid material A (pts. wt.): the liquid material B (pts. wt.): the liquid material C (pts. wt.)=50:50:4.

TABLE 2

Components of each liquid material used in the example

| Liquid material A | Liquid material B | Liquid material C |
|---|---|---|
| Base resin | Base resin | Base resin |
| Hydrophilic silica filler | Hydrophilic silica filler | Hydrophobic silica filler |
| Curing catalytic agent | Crosslinking agent | Silane-coupling agent |

The gasket material used in the comparison example includes the two liquid materials D and E. The liquid material D contains the base resin, the hydrophilic silica filler, and the curing catalytic agent, and the liquid material E contains the base resin, the hydrophilic silica filler, the crosslinking agent, and the silane-coupling agent (refer Table 3). A mixture ratio of the two liquid materials is, the liquid material D (pts. wt.): the liquid material E (pts. wt.)=50:50.

TABLE 3

Components of each liquid material used in the comparison example

| Liquid material D | Liquid material E |
|---|---|
| Base resin | Base resin |
| Hydrophilic silica filler | Hydrophilic silica filler |
| Curing catalytic agent | Crosslinking agent |
|  | Silane-coupling agent |

In the example and the comparison example, the gasket material is stored on a condition where each liquid material is sealed at a room temperature.

Figure 11:
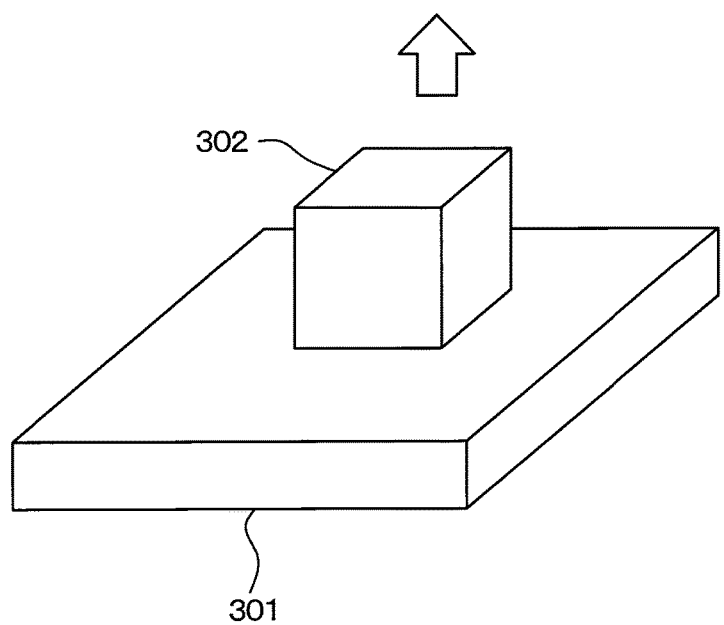
FIG. 11 is a perspective diagram illustrating a test piece and a plate that are used in an evaluation test of an adhesive strength of the gasket material according to the embodiment and the reference example.

As shown in FIG. 11, in the evaluation test of the adhesive strength, a test piece 302 is formed by curing the mixture of the liquid materials on a surface of a plate member 301 made of PA610. Then, a damaged portion formed by removing the test piece 302 from the plate member 301 is observed. The result is shown in Table 4. In Table 4, "O" means that a cohesive failure is found, in other words, the adhesive strength is strong, and "X" means that an interfacial failure is found, in other words, the adhesive strength is weak.

TABLE 4

Result of evaluation test of adhesive strength

|  | Storing days | | | |
|---|---|---|---|---|
|  | 0 | 14 | 30 | 60 |
| Example | O | — | O | O |
| Comparison example | O | O | X | X |

In the comparison example, when the liquid materials are stored for 0 day or 14 days, the cohesive failure was found, and the test piece 302 was damaged, as shown in Table 4. The result explains that the cured gasket material has a high adhesive strength in a case where the liquid materials are stored for shorter than or equal to 14 days. However, in a case where the liquid materials are stored for 30 days or 60 days, the interfacial failure was found, and a boundary surface between the plate member 301 and the test piece 302 was damaged. The result explains that the cured gasket material has a low adhesive strength in a case where the liquid materials are stored for longer than or equal to 30 days.

In contrast, in the example of the present disclosure, the cohesive failure was found in a case where the liquid materials are stored for 0 day, 14 days, 30 days, or 60cays. Thus, it is obvious that the adhesive strength of the cured gasket material can be prevented from decreasing.

Above-described changes and modifications are to be understood as being within the scope of the present disclosure as defined by the appended claims.

What is claimed is:

1. A manufacturing method of a gasket adhering to a resin member, the manufacturing method comprising:
   mixing a plurality of liquid materials stored separately; and
   molding the gasket that is made of a mixture of the plurality of liquid materials, wherein
   the mixture constitutes a liquid silicone-rubber composition that contains a base resin, a crosslinking agent, a curing catalytic agent, a hydrophilic silica filler, and a silane-coupling agent,
   the hydrophilic silica filler and the silane-coupling agent are contained in different liquid materials before the plurality of liquid materials are mixed,
   the plurality of liquid materials includes a first liquid material, a second liquid material, and a third liquid material,
   the first liquid material contains the base resin and the curing catalytic agent,
   the second liquid material contains the crosslinking agent,
   the third liquid material contains the silane-coupling agent,
   at least one of the first liquid material and the second liquid material contains the hydrophilic silica filler, and
   the third liquid material contains no hydrophilic silica filler.

2. The manufacturing method according to claim 1, wherein the molding includes:
   injection molding using the mixture of the plurality of liquid materials;
   curing the liquid silicone-rubber composition by heat; and coupling the gasket with the resin member, the coupling promoted by the silane-coupling agent.

3. The manufacturing method according to claim 1, wherein the resin member includes a resin tank for a heat exchanger.

4. The manufacturing method according to claim 1, wherein the first liquid material contains the base resin, the hydrophilic silica filler, and the curing catalytic agent, the second liquid material contains the base resin, the hydrophilic silica filler, and the crosslinking agent, and the third liquid material contains the base resin, a hydrophobic silica filler, the silane-coupling agent, and no hydrophilic silica filler.

\* \* \* \* \*